United States Patent

[11] 3,568,188

| [72] | Inventors | William Fishbein<br>Elberon;<br>Otto E. Rittenbach, Neptune, N.J. |
|---|---|---|
| [21] | Appl. No. | 624,650 |
| [22] | Filed | Mar. 7, 1967 |
| [45] | Patented | Mar. 2, 1971 |
| [73] | Assignee | the United States of America, as represented by the Secretary of the Army |

[54] CONTINUOUS WAVE RADAR WITH MEANS FOR INDICATING MOVING TARGET DIRECTION
6 Claims, 3 Drawing Figs.

[52] U.S. Cl. .................................................. 343/7.7,
343/9, 343/17.5
[51] Int. Cl. .................................................. G01s 9/42
[50] Field of Search ........................................... 343/7.7, 9,
10, 17.5

[56] References Cited
UNITED STATES PATENTS
3,299,426    1/1967    Learned et al. ............... 343/7.7

Primary Examiner—Rodney D. Bennett, Jr.
Assistant Examiner—Malcolm F. Hubler
Attorneys—Harry M. Saragovitz, Edward J. Kelly, Herbert Berl and Julian C. Keppler ABSTRACT: A continuous wave radar set in which the transmitted wave is periodically gradually reversed in phase by frequency modulating the microwave oscillator thereof. The target echoes are heterodyned with a sample of the transmitted wave and applied in parallel to an all-range channel and a ranging channel. Doppler frequency signals from all moving targets within the radar beam appear in the all-range channel, whereas in the ranging channel Doppler frequency signals at any range can be selected by means of range gates. By correlating Doppler signals from the two channels, or a pair of signals from the ranging channel, target range and directivity information may be obtained.

INVENTORS,
WILLIAM FISHBEIN
OTTO E. RITTENBACH.

INVENTORS,
WILLIAM FISHBEIN
OTTO E. RITTENBACH.

CONTINUOUS WAVE RADAR WITH MEANS FOR INDICATING MOVING TARGET DIRECTION

The present invention relates to a continuous wave (C.W.) radar intended for use in battlefield surveillance, and more particularly to such a radar in which the transmitted waves is periodically frequency modulated to such an extent and duration that the transmitted wave periodically undergoes a phase change of 180°. The target echoes are heterodyned with a sample of the transmitted wave and applied to a ranging channel and to an all-range channel. The all-range channel responds to targets at all ranges and the ranging channel can be used to determine the range of a particular target. The radar set includes electrical correlation circuitry for cross-correlation of the Doppler signals resulting from moving targets in the beam of the radar. Since the signal-to-noise ratio of the two channels is different at different ranges, the correlation process provides a means for detecting noisy signals in one channel by correlation against a less noisy signal from another channel. Further, the circuitry includes means for deriving and correlating a pair of Doppler signals derived from different sources but resulting from the same moving target echo signal and determining the direction of target movement from the phase relation of the two Doppler signals.

This application is an improvement on two similar type radar sets disclosed in the copending applications Ser. No. 217,243, of William Fishbein entitled "Combined Pulse and Continuous Wave Radar," and Ser. No. 563,623, of William Fishbein and Otto E. Rittenbach, the present inventors, entitled "Continuous Wave Correlation Radar." In the circuitry of the first-mentioned copending application, the microwave carrier is simultaneously modulated by two different types of modulation signals. In the circuitry of the other copending application, a square wave modulation signal periodically reverses the phase of the carrier. In the present circuitry, the phase of the carrier is also periodically reversed, but the phase reversal is accomplished gradually by modulating the carrier frequency by a predetermined amount and for a predetermined time necessary to effect the phase reversal, or 180° phase shift of the carrier. This gradual phase shift produces Doppler frequency components which permit the determination of moving target directivity by a correlation process.

It is thus an object of the present invention to provide a continuous wave radar set capable of resolving moving targets in range and also capable of determining the direction of target movement.

Another object of the invention is to provide a continuous wave radar set in which range and moving target information is obtained by cross-correlation of differently-derived Doppler frequency signals.

These and other objects and advantages of the invention will become apparent from the following detailed description and drawings, in which.

Figure 1:
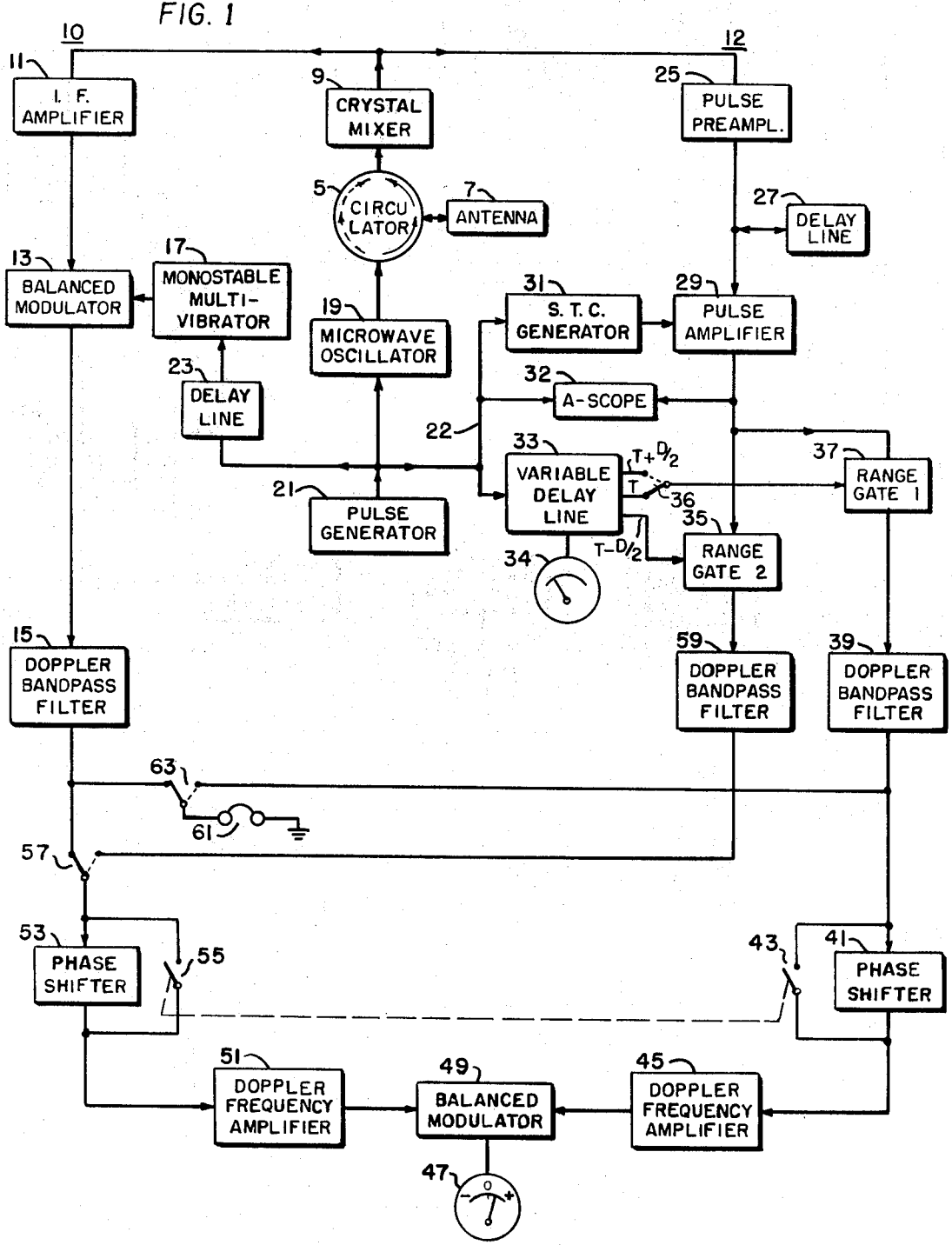
FIG. 1 is a block diagram of a preferred embodiment of the invention.

Referring first to FIG. 1, the microwave oscillator 19 is periodically frequency modulated by the output of pulse generator 21. The pulse output of generator 21 is shown in FIG. 2a. The microwave oscillator may be a klystron which can be easily frequency modulated by changing the repeller voltage, and the pulse generator output would then be applied to the repeller. The amplitude and duration of the frequency modulating pulses are chosen so that each pulse advances or retards the phase of the microwave oscillator by 180°. Thus the carrier phase is reversed with each modulating pulse, as a result of the gradual and linear phase change caused by the frequency modulation of the microwave oscillator. This is illustrated in FIG. 2b, which is a graph of the phase change of the microwave oscillator vs time. It can be seen that the phase advances by $\pi$ radians, or 180°, with each frequency modulating pulse applied thereto. The frequency or pulse repetition rate of the pulse generator is chosen so that the round trip transit time to a target at the maximum design range of the radar is less than the interpulse period, to avoid range ambiguities. The output of the microwave oscillator is applied to the circulator 5 which functions as a duplexer for applying the transmitted wave to the antenna 7 and applying the received target echoes to the receiving channels. The direction of easy energy flow around the circulator is counterclockwise, as shown by the solid-line arrow therein. The received target echoes travel counterclockwise from the antenna to crystal mixer 9, where they are demodulated. The local oscillator signal for the mixing or demodulation comprises a small portion of the microwave oscillator output which leaks around the circulator in the clockwise direction, as indicated by the dashed-line arrow. The waveform of FIG. 2c shows the phase of a target echo which is at a round trip range of T on the time scale and which is at an integral number of wavelengths from the antenna. The target echo is seen to be the same as the transmitted wave phase but is shifted along the time axis by T seconds. Since the crystal mixer 9, which may comprise merely a diode mounted in a waveguide, merely rectifies the vector sum of the target echo and local oscillator waves applied thereto, its output will be high if the two signals are in phase, and low if the two signals are out of phase. The waveform of FIG. 2d shows the instantaneous phase difference between the local oscillator wave of FIG. 2b and the target echo signal of FIG. 2c. The resulting alternating current component of the mixer output voltage is shown in FIG. 2e. It can be seen that the mixer output voltage has a fundamental frequency equal to the repetition rate of the pulse generator 21. Also, the vector addition of the two signals has converted the trapezoidal waveform of FIG. 2d to one with cosinusoidally curved leading and trailing edges, as shown in FIG. 2e.

The output of the crystal mixer 9 is applied in parallel to the all-range channel 10 and to the ranging channel 12. The IF amplifier 11 is tuned to the pulse repetition frequency of the pulse generator and therefore will extract and pass the fundamental sinusoidal component of the mixer output. The resulting sinusoidal signal is coherently detected by means of balanced modulator 13, using a square wave signal derived from the pulse generator 21 as the reference. To this end the output of pulse generator 21 delayed by delay line 23 and applied as a triggering pulse to the monostable multivibrator 17, which is arranged to be in its nonstable state for a period equal to one-half the interpulse period of the pulse generator 21. The output of the multivibrator is thus a square wave with equal positive and negative portions and a frequency equal to that of the pulse generator. The multivibrator output forms the reference input of balanced modulator 13. The delay line 23 is set at such a delay that the balanced modulator 13 operates in a sensitive region of its characteristic for targets at approximately half the maximum range of the radar set. The balanced modulator will then be operating at reduced sensitivity for closer-in targets, thereby compensating for the increased target echo power at short ranges. This provides a sort of sensitivity time control (STC) for the all-range channel. Also, this adjustment of the delay line 23 will reduce the sensitivity for targets between half maximum range and maximum range. This arrangement permits small targets to be efficiently detected out to half maximum range while also detecting larger targets such as vehicles at longer ranges. For fixed targets, the output of the balanced modulator 13 will be direct current. Moving targets will cause Doppler frequency amplitude modulation in the output of mixer 9 which will cause the amplitude of the signal input of the balanced modulator 13 to fluctuate at the Doppler frequency. The balanced modulator demodulates the input signal to yield this Doppler modulation. The DC output of the balanced modulator is blocked and the Doppler frequencies therein are passed by Doppler Bandpass Filter 15, which may be tuned, for example, to pass frequencies between 30 and 1000 c.p.s. for an x-band radar. The all-range channel responds to moving targets at any range and hence a plurality of Doppler signals may be present therein at any one time. The headset 61 is selectively connectable to either the all-range or ranging channel by means of switch 63. In the illustrated position of the switch 57, the output of the Doppler Band-pass Filter 15 is applied to one input of the correlation circuitry comprising the phase shifter 53, the Doppler Frequency Amplifier 51, balanced modulator 49 and indicator 47.

Figure 2:
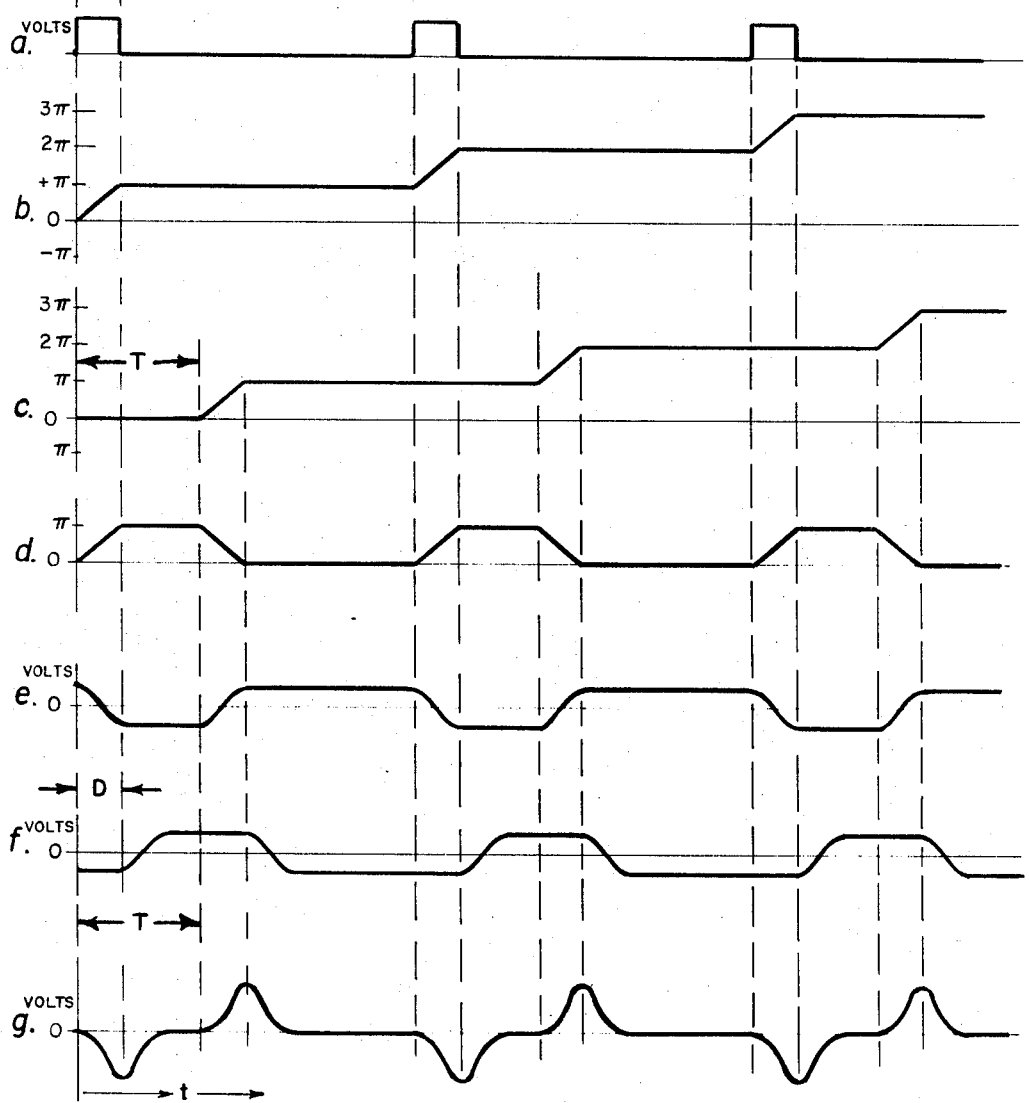
FIG. 2 is a series of waveforms illustrating the operation of the circuit of FIG. 1.
Figure 3:
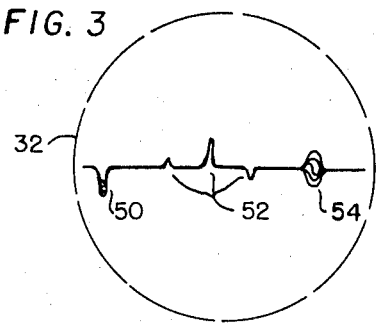
FIG. 3 illustrates several target blips which may appear on the A-scope 32 of FIG. 1.

In the ranging channel 12 the higher frequency video components of the mixer output are preserved to permit range measurement of a particular moving target. The pulse preamplifier 25 amplifies the mixer output without distorting its waveshape. The preamplifier output is applied to pulse amplifier 29 and also to the input of delay line 27. The opposite end of this delay line is shorted and the waveform upon reflection from this short circuit will suffer a phase reversal. FIG. 2f shows the reflected and delayed waveform as it emerges from the delay line, if its input is the waveform of FIG. 2e. It can be seen that the waveform of FIG. 2f is the same as that of FIG. 2e with reversed polarity and shifted by D seconds along the time axis, D being the round trip transit time of the delay line 27. Due to the fact that the preamplifier 25 and the delay line 27 have appreciable and approximately equal internal impedances, the outputs thereof will be algebraically added at the input of amplifier 29 to produce the waveform of FIG. 2g. This waveform comprises alternate positive and negative generally bell-shaped pulses with the spacing from the leading edge of the negative pulse to the leading edge of the positive pulse equal to T, the target range. The CW signal has thus been converted into a pulse type radar video signal with the pulses of one polarity (positive) corresponding to target echoes which vary in time depending on target range and the negative pulses remaining fixed in time. The negative pulses of FIG. 2g represent the sum of the target echoes at all ranges and since these pulses remain fixed in time they are somewhat analogous to the transmitter pulses of a pulse radar, however in the absence of a target within the radar beam, these negative pulses will disappear. The round trip delay (D) of the line 27 determines the width of the bell-shaped video pulses at the input and output of amplifier 29 and in practice D is chosen to obtain an optimum compromise between signal-to-noise ratio and range resolution. It can be seen that the method of converting from a continuous wave signal to a pulse type signal is the same as in the aforementioned application Ser. No. 563,623, but the resulting pulses are bell-shaped rather than square, due to the fact that the phase of the transmitted signal in the present circuitry changes gradually rather than abruptly. The sensitivity time control generator 31 applies a ramp type signal to the pulse amplifier 29 in known fashion to vary the gain thereof with range and thereby equalize the amplifier output for input pulses of different amplitudes representing targets at different ranges. The STC generator is triggered by the output of the pulse generator via lead 22. The A-scope 32 has its signal input connected to the output of the pulse amplifier 29 and is also triggered by the pulse generator via lead 22. The A-scope will display both stationary and moving targets. Although the waveforms of FIG. 2 illustrate only a single stationary target, there will normally be a large number of target blips simultaneously present in the ranging channel, representing both moving and stationary targets. FIG. 3 shows a typical A-scope display including three stationary target blips 52 and a single moving target blip 54. The blip 50 represents the fixed transmitter pulses of FIG. 2g. The moving target blip 54 undergoes variations of amplitude and polarity caused by the changing number of wavelengths between the radar and the moving target, to produce a butterfly pattern 54 on the A-scope which is characteristic of pulse radar moving target indicators. The polarity of the fixed target blips 52 may be negative or positive depending on the target position relative to the antenna. The waveforms of FIG. 2 assume a stationary target at an integral number of wavelengths from the antenna. If a target with such a position moves through one wavelength either toward or away from the antenna, its echo blip will first decrease to zero, become negative, again decrease and pass through zero to its original positive value after one wavelength of movement. These variations of amplitude and polarity with target movement constitute the Doppler modulation of the target echoes.

The ranging channel further includes a pair of range gates for selecting target blips at selected ranges for further processing in the correlation circuitry. A Doppler signal derived from the ranging channel may be correlated with the same Doppler signal in the all-range channel, or a pair of Doppler signals both of which are obtained from the ranging channel may be correlated. The variable delay line 33 has its input connected to the output of pulse generator 21. The delay of the line 33 is manually variable by means of the control 34, which is calibrated in terms of range T. The delay line 33 is tapped to provide output pulses with three different values of delay, T, T+D/2 and T−D/2. The output pulse on lead T will be delayed relative to the input pulse from generator 21 by the indicated setting, T, of manual control 34, the pulse on lead T+D/2 will be additionally delayed by a period equal to D/2, where D is the round trip transit time of delay line 27, and the pulse on lead T−D/2 will be delayed less than the setting of control 34 by D/2 seconds. The pulses, on lead T−D/2 apply a gating signal to range gate 35, the signal input of which is the output of pulse amplifier 29. The switch 36 is connected so that either the T or T+D/2 pulse may be applied as the gating signal to range gate 37, the signal input of which is also the output of pulse amplifier 29. The Doppler Band-pass Filter 39 selects the Doppler signals in the range of interest from the output of range gate 37 for application to the correlation circuitry. The Doppler frequencies are applied to headset 61 via switch 63 and to phase shifter 41. The phase shifted pulse Doppler signals are amplified by Doppler frequency amplifier 45 and then applied to the second input of balanced modulator 49. The Doppler signals in the output of range gate 35 are selected by Doppler Band-pass Filter 59. These pulse Doppler signals may be correlated with those in the output of range gate 37 by throwing switch 57 to the dashed-line position, thus disconnecting the all-range channel from the correlation circuitry and connecting the output of filter 59 thereto. The phase shifters 41 and 53 are designed to have a differential phase shift of 90°, that is, one of these phase shifters will shift the phase of the applied signals 90° more, or 90° less than the other phase shifter. The phase shifters may be selectively bypassed or shorted by closing ganged switch 43 and 55. The correlation is accomplished by the balanced modulator 49 and indicator 47. The two signals are multiplied by the balanced modulator and the correlation therebetween is proportional to the DC components resulting from the multiplication process. This DC component is measured by the indicator 47, which is a zero-center voltmeter. The inertia of the meter movement performs the integration function which is part of the correlation process. An advantage of the use of the voltmeter movement for integration is that certain types of clutter signal will be attenuated thereby. For example, clutter signals caused by the oscillatory movement of foliage as a result of wind will tend to deflect the zero-center voltmeter first in one sense and then in the other. If the time constant of the meter movement is greater than the period of the oscillatory foliage movement, these Doppler clutter signals will be attenuated.

The operation of the circuitry is as follows: The headset 61 is normally connected to the all-range channel 10 by means of switch 63. This permits the operator to monitor moving targets at all ranges within the antenna beam. When a target of interest is thus aurally detected it is kept in the beam by continued monitoring of the all-range channel and by antenna scanning, if necessary. In some cases the approximate range of a desired moving target can be obtained from the A-scope. The moving target range can be more accurately measured in the same way as it is in the radar set of the aforementioned application Ser. No. 563,623 by connecting switch 36 to the T output of delay line 33, bypassing both phase shifters 41 and 53 by closing ganged switches 43 and 55 and connecting all-range channel 10 to the correlation circuitry by means of switch 57. The control T is then adjusted by trial and error until the deflection of indicator 47 shows maximum correlation. The headset 61 may be switched to the ranging channel to assist in identifying the pulse Doppler signals in the output of filter 39. An alternate way of measuring range which can give more accurate results involves switching in both phase shifters 41 and 53 by opening switches 43 and 55 and adjusting the delay control 34 until a null or zero reading is obtained on indicator 47. Since the Doppler signals from the target applied to the correlator from the two channels then will be in quadrature due to the 90° differential phase shift of the phase shifters 41 and 53, multiplication thereof will yield no DC component and hence there will be a null reading on the indicator at maximum correlation. Since nulls are usually sharper than maximum readings, this method usually gives increased range resolution.

There are two methods of obtaining the direction of target movement along the radius of the radar beam, one method being advantageous for nearby targets and the other for far out targets. Since the target echo signal-to-noise ratio of the pulse or ranging channel goes down with the fourth power of the target range while the all-range channel provides a higher signal-to-noise ratio near maximum design range, the target directivity information for far out targets can best be obtained by correlating the all-range channel signals with the pulse Doppler signals of the ranging channel, thus taking advantage of the favorable signal-to-noise ratio of the all-range channel at such ranges. The target directivity information is contained in the relative phases of the all-range channel Doppler signal and the same Doppler signal obtained from the pulse channel by means of a range gate pulse which is displaced or offset from the center of the moving target blip. The T+D/2 output of the delay line 33 provides such an offset range gate pulse. In this method, if the indicator has been nulled with the switch 36 at the T position, as previously described, and the switch 36 is then thrown to the T+D/2 output of the delay line 33, the indicator 47 will swing to either a plus or minus reading depending on the moving target directivity. That is, a positive reading will indicate an incoming target and a negative reading an outgoing target, or vice versa. The Doppler signals of a given target obtained by range gating the center of the target blip will have a given phase which will be the same as those of the same target in the all-range channel. Due to the differential phase shift of the phase shifters 41 and 53, these signals will be in quadrature at the inputs of balanced modulator 47 and thus produce a null with the switch 36 at the T position as previously explained. With the range gate set at T+D/2, the pulse Doppler signals will change in phase relative to the Doppler signal of the same target in the all-range channel, with the sense of the phase change dependent on the target directivity. Thus the phase shifted inputs of the balanced modulator 49 will no longer be in quadrature and the indicator 47 will show the sense of the phase shift and hence the target direction.

The alternate method of obtaining target directivity involves correlating two range gated Doppler signals from the ranging channel, with the range gates of these two signals offset in different directions from the center of the moving target blip. This method is preferred for close-in targets because the pulse Doppler signals are stronger at such ranges, as explained above. In order to accomplish this correlation, the output of range gate 35 is connected to the correlation circuitry in place of the all-range channel output by throwing switch 57 to its dashed line position, the switch 36 is set at the T+D/2 position and the phase shifters 41 and 53 are switched into the circuit. Since the range gate 35 is connected to the T−D/2 output of the delay line 33, the two range gates are each offset from the center of the target blip by D/2 seconds. The target directivity will then be indicated by the sense of the deflection of the indicator 47, as it was with the previously described method. The Doppler frequency signals at the two range gate outputs will be in quadrature, this is, one will lead the other by 90°. Depending on which Doppler signal leads the other, phase shifters 41 and 53 will either bring these signals into phase at the inputs to balanced modulator 49, to yield a positive deflection of indicator 47, or will bring the Doppler signals to phase opposition to yield a negative indicator deflection. For a target whose directivity is the opposite, the leading and lagging relative phases of the Doppler signals from the two range gates will be interchanged, resulting in an opposite indicator deflection. The gradual phase reversal of the transmitted wave gives rise to these quadrature Doppler components which make it possible to measure target directivity.

While the invention has been described in connection with preferred embodiment, modifications thereof are possible without departing from the inventive concepts disclosed herein; hence the invention should be limited only by the scope of the appended claims.

I claim:

1. A continuous wave radar set comprising, means to transmit a continuous wave signal in the microwave region, a pulse generator to periodically frequency modulate said transmitted signal to such an extent and for such duration that said transmitted signal periodically, gradually and linearly reverses phase, means to demodulate target echo signals by mixing said signals with a sample of said transmitted signal, an all-range channel and a ranging channel, means to apply the demodulated target echoes in parallel to said all-range channel and to said ranging channel, said all-range channel comprising an intermediate frequency amplifier to select the fundamental frequency component of the echo signals applied thereto, a first balanced modulator connected to the output of said intermediate frequency amplifier for coherently demodulating said fundamental frequency component, using as a reference signal therefore a square wave signal derived from said pulse generator, a first Doppler band-pass filter connected to the output of said first balanced modulator, said ranging channel comprising, a pulse preamplifier, a means comprising a shorted delay line connected to the output of said preamplifier for converting said continuous wave signal to a pulse type signal, a pulse amplifier connected to said pulse preamplifier and said shorted delay line, a manually variable delay line connected to the output of said pulse generator, said variable delay line having manual delay control and three outputs, the first output thereof corresponding to the indicated setting of said delay control, the second output thereof having a greater delay and the third output thereof having a lesser delay than said first output, first and second range gates, means to selectively connect either said first or second delay line output as a gating signal to said first range gate, the third output of said delay line being connected as a gating signal to said second range gate, the signal inputs of both said range gates being the output of said pulse amplifier, a second Doppler band-pass filter connected to the output of said first range gate and a third Doppler band-pass filter connected to the output of said second range gate, first and second phase shifters and a second balanced modulator, the output of said second Doppler band-pass filter connected to the input of said first phase shifter, the output of said first phase shifter applied as one input to said second balanced modulator, the output of either said first or third Doppler band-pass filter being selectively connectable to the input of said second phase shifter, the output of said second phase shifter applied as the other input of said second balanced modulator, the differential phase shifts of said first and second phase shifters being 90°, and a zero-center voltmeter connected to the output of said second balanced modulator.

2. The apparatus of claim 1, further comprising a pair of ganged switches for selectively bypassing said phase shifters.

3. The apparatus of claim 1 further including on A-scope connected to the output of said pulse amplifier and triggered by the output of said pulse generator.

4. A continuous wave radar set comprising, means to radiate into space a microwave signal which is periodically frequency modulated such that the signal gradually reverses phase, means to receive and to heterodyne target echoes with a sample of said transmitted signal, an all-range channel and a ranging channel, means to apply the heterodyned target signal in parallel to said all-range channel and to said ranging channel, said all-range channel comprising means to detect moving target signals at all ranges within the beam of said radar set and said ranging channel comprising means to convert said target echoes into pulse type signals, and range gating means for selecting moving target signals at desired ranges, means connected to the outputs of said all-range and ranging channels for differentially shifting the phases of said channel outputs by 90°, and means for correlating said phase shifted outputs.

5. The apparatus of claim 4 wherein said means for correlating comprises a balanced modulator with a zero-center voltmeter connected to the output thereof.

6. A continuous wave radar set comprising, means to radiate into space a microwave signal which is periodically frequency modulated such that the signal gradually reverses phase, means to receive and to heterodyne target echoes with a sample of said transmitted signal, an all-range channel and a ranging channel, means to apply the heterodyned target signals in parallel to said all-range channel and to said ranging channel, said all-range channel comprising means to detect moving target signals at all ranges within the beam of said radar set, said ranging channel comprising means to convert target echoes into pulse type signals and a pair of range gates for selecting moving target signals at desired ranges, correlation circuitry having a pair of inputs, means for connecting the output of one of said range gates to one input of said correlation circuitry and switch means for selectively connecting either the output of said all-range channel or the output of the other one of said range gates to the other input of said correlation circuitry.